(12) United States Patent
Wang et al.

(10) Patent No.: US 11,334,255 B2
(45) Date of Patent: *May 17, 2022

(54) METHOD AND DEVICE FOR DATA REPLICATION

(71) Applicant: EMC IP Holding Company LLC, Hopkinton, MA (US)

(72) Inventors: Kun Wang, Beijing (CN); Colin Yong Zou, San Jose, CA (US); Sean Cheng Ye, Beijing (CN); Lyne Yuwei Li, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/572,165

(22) Filed: Sep. 16, 2019

(65) Prior Publication Data

US 2020/0012440 A1 Jan. 9, 2020

Related U.S. Application Data

(63) Continuation of application No. 15/387,841, filed on Dec. 22, 2016, now Pat. No. 10,459,642.

(30) Foreign Application Priority Data

Dec. 30, 2015 (CN) .......................... 201511023162.8

(51) Int. Cl.
*G06F 3/06* (2006.01)
*H04L 67/1097* (2022.01)
*H04L 29/06* (2006.01)

(52) U.S. Cl.
CPC ............ *G06F 3/0619* (2013.01); *G06F 3/065* (2013.01); *G06F 3/067* (2013.01); *G06F 3/0641* (2013.01); *H04L 63/0428* (2013.01); *H04L 63/123* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 10,459,642 B2* | 10/2019 | Wang | | G06F 3/0619 |
| 2010/0199065 A1* | 8/2010 | Kaneda | | G06F 3/0659 |
| | | | | 711/209 |
| 2011/0055471 A1* | 3/2011 | Thatcher | | G06F 3/0608 |
| | | | | 711/114 |

(Continued)

FOREIGN PATENT DOCUMENTS

| | | |
|---|---|---|
| CN | 102298547 | 12/2011 |
| CN | 102722583 | 10/2012 |
| CN | 104683359 | 6/2015 |

*Primary Examiner* — Kaveh Abrishamkar
(74) *Attorney, Agent, or Firm* — BainwoodHuang

(57) ABSTRACT

There is provided a method and device for data replication. The method comprises: obtaining, in a network interface card, data segments by segmenting input first data; determining, in the network interface card, fingerprints corresponding to the data segments; and comparing, in a central processing unit, the fingerprints of the data segments with existing fingerprints corresponding to processed data segments, and determining, based on a result of the comparing, whether to de-duplicate the data segments corresponding to the fingerprints, to perform the data replication.

21 Claims, 3 Drawing Sheets

(56) References Cited

U.S. PATENT DOCUMENTS

| | | | |
|---|---|---|---|
| 2013/0318051 A1* | 11/2013 | Kumar | G06F 16/1748 707/692 |
| 2014/0101113 A1* | 4/2014 | Zhang | G06F 16/1748 707/692 |
| 2015/0286414 A1 | 10/2015 | Gordon et al. | |
| 2016/0139849 A1* | 5/2016 | Chaw | G06F 3/0611 711/119 |

* cited by examiner

METHOD AND DEVICE FOR DATA REPLICATION

RELATED APPLICATIONS

This application is a continuation of U.S. patent application Ser. No. 15/387,841, filed Dec. 22, 2016 and entitled "METHOD AND DEVICE FOR DATA REPLICATION," which claims benefit of the priority of Chinese Patent Application No. CN201511023162.8, filed on Dec. 30, 2015 at the State Intellectual Property Office, China, entitled "METHOD AND DEVICE FOR DATA REPLICATION." The contents and teachings of both prior applications are incorporated herein by reference in their entirety.

FIELD

The present disclosure generally relates to the field of storage, and more specifically, relates to a method and device for data replication.

BACKGROUND

In a data storage device, for example a data replication product DATA DOMAIN of the EMC corporation, prior to replicating a large amount of data to the storage device (such as a disk), a duplicate data removing operation is firstly required, which is also named as de-duplication, to replicate updated portions in the large amount of data to the storage device, thereby saving storage space.

However, in such a data storage device, relevant operations including the de-plication, such as data segmentation, compression/decompression, encryption/decryption, or the like, are all performed by a central processing unit (CPU). Hence, a network interface card (NIC/FC) connecting the large amount of data to be replicated and the storage device conventionally does not have any programming functions. Though the above operation for data replication may be performed through the CPU, this CPU-based solution often occupies a large amount of CPU resources and results in a lower performance per unit power output (for example, the performance per Watt), and besides, the CPU does not have any advantages in certain single-threaded processing as compared to hardware devices, such as a field programmable gate array (FPGA), or the like.

Dedicated hardware for performing the above operation (for example, Application Specific Integrated Circuit, ASIC) may be used to replace the CPU to perform the above mentioned operation. Although such kind of dedicated hardware-based solution may achieve a higher performance per unit power output, the extendibility or the design flexibility of the dedicated hardware-based network interface card are dramatically restrained due to difficulty for changing the hardware.

SUMMARY

In order to solve the above problem, the embodiments of the present disclosure provide a network interface card-based, particularly for example, method for data replication of a FPGA-based network interface card and a device thereof.

A first aspect of the present disclosure provides a method for data replication, comprising: obtaining, in a network interface card, data segments by segmenting input first data; determining, in the network interface card, fingerprints corresponding to the data segments; and comparing, in a central processing unit, the fingerprints of the data segments with existing fingerprints corresponding to processed data segments, and determining, based on a result of the comparing, whether to de-duplicate the data segments corresponding to the fingerprints, to perform the data replication.

According to embodiments of the present disclosure, the network interface card is configured as a field programmable gate array (FPGA)-based network interface card.

Since some operations particularly suitable to be performed by the network interface card, such as data segmentation, etc., are changed to be performed in the network interface card, the CPU resource utilization is reduced, thereby realizing optimization of the overall cost performance and the power performance ratio.

According to embodiments of the present disclosure, determining, in the network interface card, fingerprints (FPs) corresponding to the data segments comprises: determining, in the network interface card, the fingerprints corresponding to the data segments based on a secure hash algorithm SHA1.

It should be indicated that the advantages of replacing the data segment with the fingerprint lie in that only a few bytes (for example, the fingerprint output by the SHA1 algorithm only have 16 bytes) are used to represent a data segment, such that it is not necessary to compare each data segment with the existing data segments byte by byte during the following de-duplication, and only the fingerprint representing the corresponding data segment and having a few bytes is compared with the existing fingerprints. Though the fingerprint obtained through for example the SHA1 algorithm loses an amount of information, there causes a quite low error rate due to a sophisticated design of the algorithm when the fingerprint obtained through the algorithm is used to perform the following de-duplication judgment. This remarkably reduces calculation complexity of the CPU.

According to embodiments of the present disclosure, the method comprises, prior to segmenting the first data, obtaining, through protocol processing, the first data from a data packet entering into the network interface card.

The protocol processing operation allows extraction of corresponding original data from a data packet input through different interfaces, such as a network interface card interface (NIC) or a fiber channel interface (FC), and the like, for the subsequent segment processing.

According to embodiments of the present disclosure, comparing, in a central processing unit, the fingerprints of the data segments with existing fingerprints corresponding to processed data segments, and determining, based on a result of the comparing, whether to de-duplicate the data segments corresponding to the fingerprints comprises: if a fingerprint matches with any of the existing fingerprints, de-duplicating, by the central processing unit, the data segment corresponding to the fingerprint.

According to embodiments of the present disclosure, comparing, in a central processing unit, the fingerprints of the data segments with existing fingerprints corresponding to processed data segments, and determining, based on a result of the comparing, whether to de-duplicate the data segments corresponding to the fingerprints comprises: if a fingerprint matches with none of the existing fingerprints, determining, by the central processing unit that the data segment corresponding to the fingerprint is a data segment unable to be de-duplicated; and compressing, in the network interface card, the data segment unable to be de-duplicated.

The in-line de-duplication performed prior to replicating the data to the storage device efficiently reduces occupancy of the duplicate data in the storage space.

Optionally, the method may comprises: encrypting the compressed data segment in the network interface card.

According to embodiments of the present disclosure, the method further comprises: after determining the fingerprints corresponding to the data segments, writing the fingerprints together with the data segments corresponding to the fingerprints from the network interface card to a first cache.

According to embodiments of the present disclosure, the method further comprises: prior to comparing the fingerprints with the existing fingerprints, reading, by the central processing unit, the fingerprints from a first cache.

According to embodiments of the present disclosure, the method further comprises: after comparing the fingerprints with the existing fingerprints, reading, by the central processing unit, from a first cache the data segment unable to be de-duplicated for used in compressing in the network interface card.

The use of one or more first caches accelerates the speed of the central processing unit for reading and writing (I/O) the data to be replicated and processed via the network interface card.

According to embodiments of the present disclosure, the method may further comprise: after the compressing or the encrypting, writing into a second cache the data segment compressed or encrypted in the network interface card.

A second aspect of the present disclosure provides a device for data replication, comprising: a network interface card configured to: obtain data segments by segmenting input first data, and determine fingerprints corresponding to the data segments; and a central processing unit configured to: compare the fingerprints of the data segments with existing fingerprints corresponding to processed data segments, and determine, based on a result of the comparing, whether to de-duplicate the data segments corresponding to the fingerprints, to perform the data replication.

According to embodiments of the present disclosure, the network interface card is configured as a field programmable gate array (FPGA)-based network interface card.

According to embodiments of the present disclosure, the network interface card is further configured to: determine the fingerprints corresponding to the data segments based on a secure hash algorithm.

According to embodiments of the present disclosure, the network interface card is further configured to: prior to segmenting the first data, obtain, through protocol processing, the first data from a data packet entering into the network interface card.

According to embodiments of the present disclosure, the central processing unit is further configured to: if a fingerprint matches with any of the existing fingerprints, de-duplicate the data segment corresponding to the fingerprint.

According to embodiments of the present disclosure, the central processing unit is further configured to, if a fingerprint matches with none of the existing fingerprints, determine that the data segment corresponding to the fingerprint is a data segment unable to be de-duplicated; and the network interface card is further configured to compress the data segment unable to be de-duplicated.

According to embodiments of the present disclosure, the network interface card is further configured to: encrypt the compressed data segment.

According to embodiments of the present disclosure, the network interface card is further configured to: after determining the fingerprints corresponding to the each data segments, write the fingerprint together with the data segments corresponding to the fingerprints from the network interface card into a first cache.

According to embodiments of the present disclosure, the central processing unit is further configured to: prior to comparing the fingerprints with the existing fingerprints, read the fingerprints from a first cache.

According to embodiments of the present disclosure, the central processing unit is further configured to: after comparing the fingerprints with the existing fingerprints, read, from a first cache, the data segment unable to be de-duplicated for use in compressing in the network interface card.

According to embodiments of the present disclosure, the network interface card is further configured to: after the compressing or the encrypting, write, into a second cache, the data segment compressed or encrypted in the network interface card.

A third aspect of the present disclosure provides a computer program product for data replication, the computer program product being tangibly stored on a non-transient computer readable medium and comprising a machine executable instruction which enables, during being executed, the machine to execute steps of the method according to the first aspect.

A fourth aspect of the present disclosure provides a data storage device for executing the method for data replication according to the first aspect.

DETAILED DESCRIPTION OF EMBODIMENTS

Principles of the present disclosure are described with reference to several exemplary embodiments shown in the figures. Although figures show preferred embodiments of the present disclosure, it should be appreciated that these embodiments are described only to enable those skilled in the art to better understand and implement the present disclosure, and not intended to limit the scope of the present disclosure in any manner.

Figure 1:
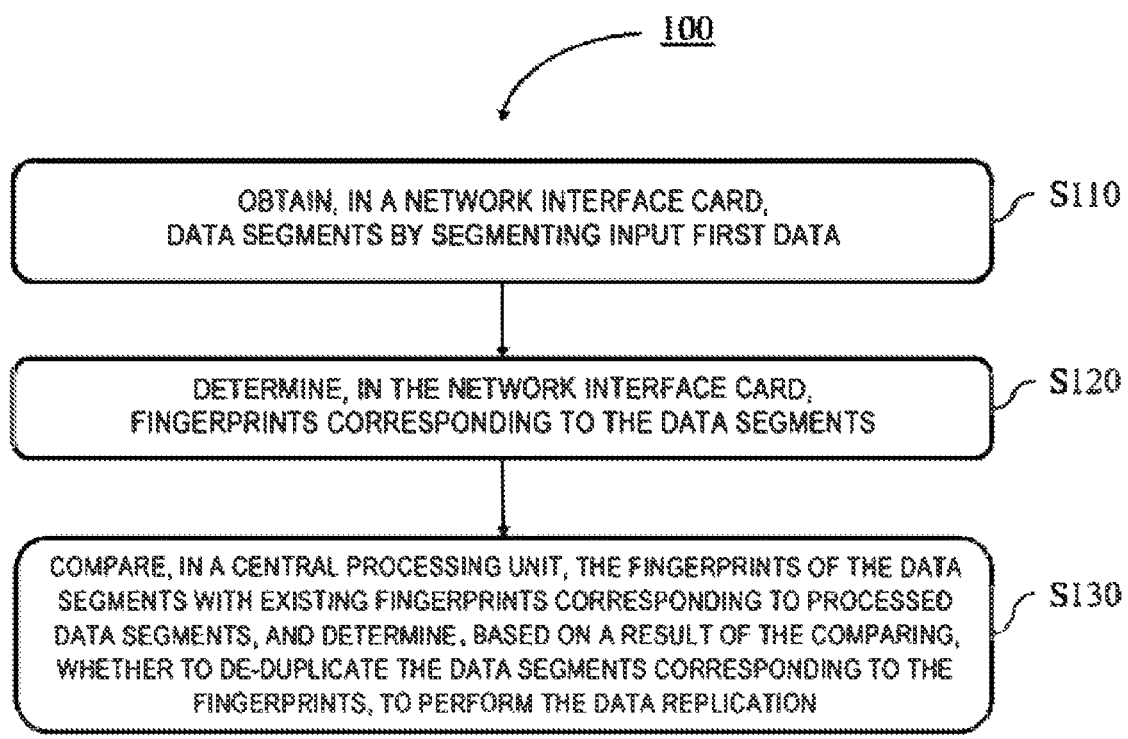
FIG. 1 illustrates a flow chart of a method for data replication according to embodiments of the present disclosure.

FIG. 1 illustrates a flow chart of a method 100 for data duplication according to embodiments of the present disclosure. As shown in FIG. 1, the method 100 comprises the following main steps S110-S130.

In step S110, in the network interface card, data segments are obtained by segmenting input first data; in step S120, in the network interface card, fingerprints corresponding to the data segments are determined; and in step S130, in a central processing unit, the fingerprints of the data segments are compared with existing fingerprints corresponding to processed data segments, and it is determined, based on a result of the comparing, whether to de-duplicate the data segments corresponding to the fingerprints.

Preferably, the network interface card may be configured as a field programmable gate array (FPGA)-based network interface card.

As compared to a CPU and a dedicated integrated hardware device, the FPGA involves a well compromise between the performance per unit power output and extendibility. In other words, the FPGA not only has a better extendibility than the dedicated integrated hardware device due to its programmable capability on software and hardware, but is highly suitable to perform some particular operations as mentioned above, such as data segmenting, compression/decompression, encryption/decryption, and the FPGA therefore has the performance per unit power output times more than that of the CPU. Thereupon, the network interface card for connecting the data to be replicated and the storage device, which is realized using the FPGA, generally has a better cost performance and an increased power performance ratio.

It is seen from the steps of the method 100 as shown in FIG. 1 that, as it can be proved that the step of data segmenting S110 and the step of fingerprint determining S120 are particularly suitable for the operations performed by the network interface card, these steps are combined to be performed preferably in the network interface card of the FPGA, and the de-duplicating operation S130 still remains to be executed by the CPU because it is more suitable to be executed by the CPU. This segmentation in the processing task optimizes the overall cost performance and the power performance ratio.

Figure 2:
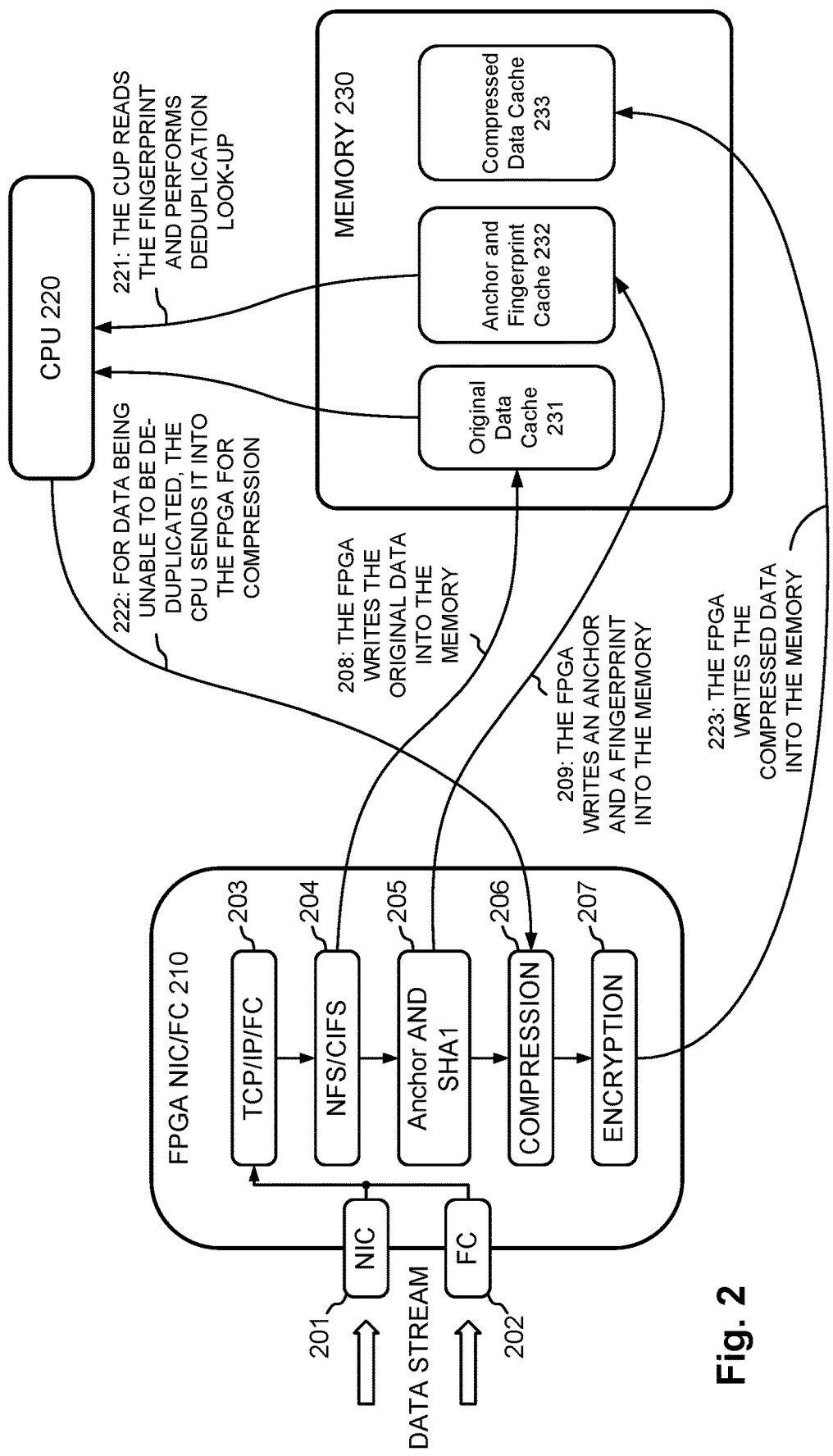
FIG. 2 illustrates a structure diagram of an FPGA-based system for data replication according to embodiments of the present disclosure.

FIG. 2 illustrates a structure diagram of an FPGA-based system for data replication according to embodiments of the present disclosure.

Referring to FIG. 2, the steps of the method 100 in FIG. 1 are detailed hereinafter.

According to the embodiments of the present disclosure, the method 100 may additionally comprises: prior to segmenting the first data (i.e., the step S110), obtaining, through protocol processing, the first data from a data packet entering into the network interface card.

According to the embodiment shown in FIG. 2, different external data packets are firstly input via a network interface card interface (NIC) 201 or a fiber channel interface (FC) 202 into an FPGA-based network interface card 210 depending on different external data sources. As the data packet input into the network interface card 210 is not original data, it subsequently needs to extract the corresponding first data as the original data from the input data packet through different protocol processing to be used in the following data segment processing. The protocol processing shown in FIG. 2 includes for example TCP/IP and FC transmission layer protocol processing 203, and for example application layer protocol processing 204 of a network file system (NFS)/common internet file system (CIFS).

After obtaining the first data as the original data, the method then proceeds to the step S110. At the step S110, the input first data are segment-processed in the network interface card to obtain a plurality of data segments.

According to the embodiment shown in FIG. 2, the first data as the original data are segment-processed through for example an anchor algorithm, as indicated by a block 205. According to a specific embodiment of the present disclosure, a plurality of data segments after being segment-processed may have different sizes ranging from several KBs to several GBs.

According to a specific embodiment of the present disclosure, the segment processing of the first data may be preferably based on variable lengths. It is because that the modification made by a user to a file (for example, the file in a GB magnitude) may be minor, for instance, only several bytes added. In this case, if the fixed-length segment processing is used, all the following data segments without modification will be altered accordingly. If the variable-length segment processing is used, only those altered data segments are adaptively drawn the attention and those unaltered data segments are not affected, thereby increasing the efficiency of de-duplicating.

It should be noted that the present disclosure is not intended to limit the algorithm for data segment processing, and any data segment algorithm should fall into the protection scope of the present disclosure.

After obtaining each data segment, the method then proceeds to the step S120. At the step S120, the fingerprints corresponding to the data segments is determined in the network interface card.

According to the embodiments of the present disclosure, the step S120 may be included in the network interface card to determine a corresponding fingerprint for each data segment based on secure hash algorithm (SHA1), as indicated by a block 205.

Similarly, the present disclosure is not intended to limit the algorithm for obtaining a fingerprint, and all algorithms for obtaining a fingerprint, besides the SHA1, shall fall into the protection scope of the present disclosure, as well.

It should be indicated that the advantages of replacing the data segments with the fingerprint lie in that only a few bytes (for example, only 16 bytes for the fingerprint output by the SHA1 algorithm) are used to represent a data segment, such that it is not necessary to compare each data segment with the existing data segments byte by byte during the following de-duplicating operation, and only the fingerprint having a few bytes and corresponding to the data segment is compared with the existing fingerprints. Though the fingerprint obtained through for example the SHA1 algorithm loses an amount of information, the error rate is quite low due to the sophisticated design of the algorithm when the fingerprint obtained through the algorithm is used to perform the following de-duplication judgment. This remarkably reduces calculation complexity of the CPU.

According to the embodiments of the present disclosure, the method 100 may further comprises: after determining the fingerprints corresponding to the data segments, writing the fingerprints together with the data segments corresponding to the fingerprints from the network interface card to a first cache (for example writing into 231, 232 as shown in FIG. 2), as illustrated by paths indicated with arrows 208 and 209.

Optionally, after obtaining a plurality of data segments and before determining the corresponding fingerprint for each data segment, the plurality of data segments may be written into the first cache 231. And then, after determining the corresponding fingerprint for each data segment, the fingerprint is written from the network interface card into the first cache 232.

Similarly, the present disclosure is not intended to limit the sequence of writing the data segment and the fingerprint into the first cache.

According to the embodiment shown in FIG. 2, the first cache comprises an original data cache 231 for storing original data, and an anchor and fingerprint cache 232 for storing an anchor and a fingerprint. According to the embodiment shown in FIG. 2, the first cache is configured as one portion of the memory 230. The original data and the fingerprint are written into the original data cache 231 and the anchor and fingerprint cache 232 for storing the anchor and the fingerprint, as illustrated respectively by paths 208 and 209 in FIG. 2.

After obtaining the fingerprint (i.e., the step S120), the method 100 then proceeds to the step S130. At the step S130, in the central processing unit, the fingerprints of the data segments are compared with the existing fingerprints corresponding to processed data segments, and it is determined, based on a result of the comparing, whether to de-duplicate the data segments corresponding to the fingerprints.

According to embodiments of the present disclosure, prior to comparing the fingerprints with existing fingerprints, the central processing unit firstly reads the fingerprint from the first cache for the following comparison operation, as illustrated by a path indicated with an arrow 221.

According to embodiments of the present disclosure, comparing, in a central processing unit, the fingerprints of the data segments with existing fingerprints corresponding to processed data segments, and determining, based on a result of the comparing, whether to de-duplicate the data segments corresponding to the fingerprints comprises: if a fingerprint matches with any of the existing fingerprints, de-duplicating, by the central processing unit, the data segment corresponding to the fingerprint.

According to one specific embodiment of the present disclosure, all existing fingerprints may be stored in for example a fingerprint lookup table, such that the fingerprint corresponding to the data segment to be replicated can be rapidly compared with the existing data fingerprints.

According to the embodiments of the present disclosure, comparing, in a central processing unit, the fingerprints of the data segments with existing fingerprints corresponding to processed data segments, and determining, based on a result of the comparing, whether to de-duplicate the data segments corresponding to the fingerprints comprises, if a fingerprint matches with none of the existing fingerprints, the central processing unit determines that the data segment corresponding to the fingerprint is a data segment unable to be de-duplicated, i.e., the updated/added data segment indeed needing to be duplicated to the storage device; and in the network interface card, the data segment unable to be de-duplicated is compressed, as shown in a dashed box 206.

According to the embodiments of the present disclosure, after comparing the fingerprints with the existing fingerprints, the central processing unit needs to read from the first cache the data segment unable to be de-duplicated, and sends the same to the FPGA for compressing in the network interface card, as illustrated by a path indicated with an arrow 222.

This may also prove that, as compared to the CPU, the FPGA-based network interface card is more suitable to perform the compressing/decompressing operation.

Optionally, the compressed data segment may be encrypted in the network interface card, as shown in a dashed box 207.

According to the embodiments of the present disclosure, after the compressing operation 206 or the optional encrypting operation 207, the data segment compressed or encrypted in the network interface card is written into the second cache, as illustrated by a path indicated with an arrow 223.

According to embodiments shown in FIG. 2, the second cache is for example a compressed data cache 233 for storing compressed data. According to the embodiment shown in FIG. 2, the second cache is also configured as a part of the memory 230.

It is seen from the embodiment shown in FIG. 2 that, as compared to a traditional network interface card, the FPGA-based network interface card design only introduces additional traffic of the anchor, the fingerprint, and the compressed data in PCIe bus.

Figure 3:
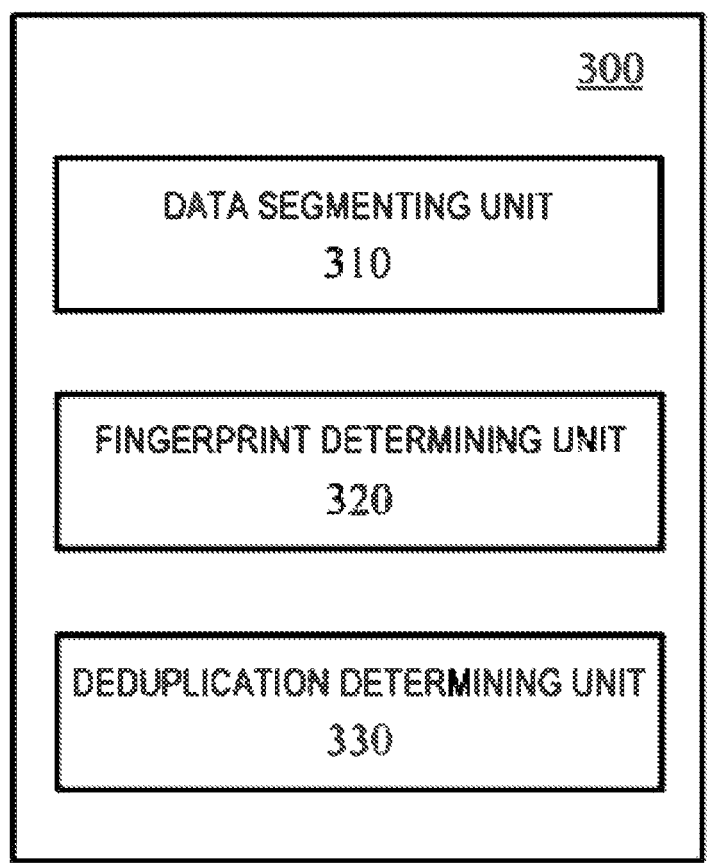
FIG. 3 illustrates a block diagram for data duplication according to embodiments of the present disclosure.

FIG. 3 illustrates a block diagram 300 of a device for data duplication according to embodiments of the present disclosure. The device 300 may comprise the following main devices: data segmenting unit 310 for obtaining, in a network interface card, data segments by segmenting input first data; fingerprint determining unit 320 for, determining, in the network interface card, fingerprints corresponding to the data segments; and de-duplication determining unit 330 for, comparing, in a central processing unit, the fingerprints of the data segments with existing fingerprints corresponding to processed data segments, and determining, based on a result of the comparing, whether to de-duplicate the data segments corresponding to the fingerprints, to perform the data replication.

According to embodiments of the present disclosure, the device for data replication comprises: a network interface card configured to: obtain data segments by segmenting input first data, and determine fingerprints corresponding to the data segments; and a central processing unit configured to: compare the fingerprints of the data segments with existing fingerprints corresponding to processed data segments, and determine, based on a result of the comparing, whether to de-duplicate the data segments corresponding to the fingerprints, to perform the data replication.

According to embodiments of the present disclosure, the network interface card may be configured as a field programmable gate array (FPGA)-based network interface card.

According to embodiments of the present disclosure, the network interface card may be further configured to determine the fingerprints corresponding to the data segments based on a secure hash algorithm.

According to embodiments of the present disclosure, the network interface card may be further configured to prior to segmenting the first data, obtain, through protocol processing, the first data from a data packet entering into the network interface card.

According to embodiments of the present disclosure, the central processing unit may be further configured to: if a fingerprint matches with any of the existing fingerprints, de-duplicate the data segment corresponding to the fingerprint.

According to embodiments of the present disclosure, the central processing unit may be further configured to, if a fingerprint matches with none of the existing fingerprints, determine that the data segment corresponding to the fingerprint is a data segment unable to be de-duplicated; and the network interface card may be further configured to compress the data segment unable to be de-duplicated.

According to embodiments of the present disclosure, the network interface card may be further configured to encrypt the compressed data segment.

According to embodiments of the present disclosure, the network interface card may be further configured to, after determining the fingerprints corresponding to the data segments, write the fingerprint together with the data segments corresponding to the fingerprints from the network interface card into a first cache.

According to embodiments of the present disclosure, the central processing unit may be further configured to, prior to comparing the fingerprints with the existing fingerprints, read the fingerprints from a first cache.

According to embodiments of the present disclosure, the central processing unit may be further configured to, after comparing the fingerprint with the existing fingerprints, read, from a first cache, the data segment unable to be de-duplicated for use in compressing in the network interface card.

According to embodiments of the present disclosure, the network interface card may be further configured to, after the compressing or the encrypting, write, into a second cache, the data segment compressed or encrypted in the network interface card.

In conclusion, each embodiment of the present disclosure provides a method for data replication, comprising: in a network interface card, performing segment-processing on input first data to obtain a plurality of data segments; in the network interface card, determining a corresponding fingerprint for each data segment; and in a central processing unit, comparing the fingerprint of the each data segment with existing fingerprints corresponding to the processed data segments one by one, and determining, based on a comparison result, whether to de-duplicate the data segment corresponding to the fingerprint, to perform data replication. Since some operations particularly suitable to be performed by the network interface card, such as data segmentation, compression/decompression, encryption/decryption, etc., are changed to be performed in the network interface card, the CPU resource utilization is reduced, thereby realizing optimization of the overall cost performance and the power performance ratio. Further, the data replicating operation performed using the method and the device of the present disclosure enables the data to undergo an efficient in-line de-duplicating operation prior to being replicated to the storage device, and occupancy of the duplicate data in the storage space is effectively reduced accordingly.

What are described above are only optional embodiments of the present disclosure and not intended to limit the present disclosure. Those skilled in the art appreciate that the present disclosure may include various modifications and variations. Any modifications, equivalent substitutions and improvements within the spirit and principle of the present disclosure should all fall within the protection scope of the present disclosure.

What is claimed is:

1. A method for data replication, comprising:
   receiving, by a network interface card, a data packet containing input data for replication;
   segmenting, by the network interface card, the input data into multiple data segments;
   computing, by the network interface card, fingerprints from the data segments;
   passing the fingerprints over a bus to a memory accessible to a CPU (central processing unit); and
   selectively deduplicating the data segments received by the network interface card responsive to the CPU successfully matching fingerprints calculated from a set of the data segments to fingerprints stored in a table in the memory, the table associating a plurality of processed data segments with fingerprints generated from those processed data segments.

2. The method of claim 1, wherein selectively deduplicating the data segments received by the network interface card further includes storing, in a storage device, a second set of the data segments that are unable to be deduplicated.

3. The method of claim 2, further comprising compressing the second set of data segments by the network interface card prior to storing the second set of data segments in the storage device.

4. The method of claim 3, wherein computing the fingerprints by the network interface card and compressing the second set of data segments by the network interface card are performed by an FPGA (Field Programmable Gate Array) of the network interface card.

5. The method of claim 3, further comprising encrypting the second set of data by the network interface card after compressing the second set of data segments by the network interface card.

6. The method of claim 5, wherein computing the fingerprints by the network interface card, compressing the second set of data segments by the network interface card, and encrypting the second set of data by the network interface card are performed by an FPGA (Field Programmable Gate Array) of the network interface card.

7. The method of claim 3, wherein passing the fingerprints over the bus to the memory accessible by the CPU includes passing the fingerprints over a PCIe (peripheral component interconnect express) bus.

8. The method of claim 3, further comprising storing the fingerprints computed from the data segments in a first cache of the memory.

9. The method of claim 8, further comprising storing the second set of data segments in a second cache of the memory, the second cache being distinct from the first cache.

10. The method of claim 3, wherein the network interface card is implemented using an FPGA and includes protocol processing for both a TCP/IP (Transmission Control Protocol/Internet Protocol) transmission layer and a FC (Fibre Channel) transmission layer.

11. The method of claim 1, wherein passing the fingerprints over the bus to the memory accessible to the CPU includes providing, for storage in a first cache of the memory, both the fingerprints and the data segments from which the fingerprints are computed.

12. A device for data replication, comprising:
    a network interface card;
    memory coupled to the network interface card over a bus; and
    a CPU (central processing unit) coupled to the memory,
    the network interface card configured to (i) receive a data packet containing input data for replication, (ii) segment the input data into multiple data segments, (iii) compute fingerprints from data segments by the network interface card and (iv) pass the fingerprints over the bus to the memory,
    the CPU configured to selectively deduplicate the data segments received by the network interface card responsive to successfully matching fingerprints calculated from a set of the data segments to fingerprints stored in a table in the memory, the table associating a plurality of processed data segments with fingerprints generated from those processed data segments.

13. The device of claim 12, wherein the network interface card is implemented using an FPGA and includes protocol processing for both a TCP/IP (Transmission Control Protocol/Internet Protocol) transmission layer and a FC (Fibre Channel) transmission layer.

14. The device of claim 13, wherein the bus is a PCIe (peripheral component interconnect express) bus.

15. The device of claim 14, wherein the memory includes:
    a first cache configured to store the fingerprints computed from the data segments; and
    a second cache, distinct from the first cache, the second cache configured to store the second set of data segments.

16. A computer program product having a set of non-transitory computer readable media that stores a set of instructions which, when carried out by computerized circuitry, cause the computerized circuitry to perform a method of performing replication, the method comprising:

receiving, by a network interface card, a data packet containing input data for replication;

segmenting, by the network interface card, the input data into multiple data segments;

computing, by the network interface card, fingerprints from data segments;

passing the fingerprints over a bus to a memory accessible to a CPU (central processing unit); and selectively deduplicating the data segments received by the network interface card responsive to the CPU successfully matching fingerprints calculated from a set of the data segments to fingerprints stored in a table in the memory, the table associating a plurality of processed data segments with fingerprints generated from those processed data segments.

17. The computer program product of claim 16, wherein selectively deduplicating the data segments received by the network interface card further includes storing, in a storage device, a second set of the data segments that are unable to be deduplicated.

18. The computer program product of claim 17, wherein the method further comprises compressing the second set of data segments by the network interface card prior to storing the second set of data segments in the storage device.

19. The computer program product of claim 18, wherein computing the fingerprints by the network interface card and compressing the second set of data segments by the network interface card are performed by an FPGA (Field Programmable Gate Array) of the network interface card.

20. The computer program product of claim 18, wherein the method further comprises encrypting the second set of data by the network interface card after compressing the second set of data segments by the network interface card.

21. The computer program product of claim 20, wherein computing the fingerprints by the network interface card, compressing the second set of data segments by the network interface card, and encrypting the second set of data by the network interface card are performed by an FPGA (Field Programmable Gate Array) of the network interface card.

\* \* \* \* \*